United States Patent [19]

Irie

[11] Patent Number: 5,589,200
[45] Date of Patent: Dec. 31, 1996

[54] SPLIT MOLD APPARATUS FOR A TIRE VULCANIZER

[75] Inventor: Nobuhiko Irie, Nagasaki, Japan

[73] Assignee: Mitsubishi Jukogyo Kabushiki Kaisha, Tokyo, Japan

[21] Appl. No.: 446,571

[22] Filed: May 19, 1995

[30] Foreign Application Priority Data

Jun. 3, 1994 [JP] Japan .................. 6-122661
Apr. 10, 1995 [JP] Japan .................. 7-084109

[51] Int. Cl.⁶ .......................... B29D 30/06; B29C 33/24
[52] U.S. Cl. .......................... 425/46; 425/47
[58] Field of Search .......................... 425/34.1, 46, 47, 425/48

[56] References Cited

U.S. PATENT DOCUMENTS

| | | | |
|---|---|---|---|
| 3,730,658 | 5/1973 | Marra | 425/47 |
| 3,779,677 | 12/1973 | Greenwood | 425/46 |
| 3,817,670 | 6/1974 | Leblond | 425/46 |
| 3,901,632 | 8/1975 | Prosdocimi | 425/46 |
| 4,129,406 | 12/1978 | Capecchi | 425/46 |
| 4,580,959 | 4/1986 | Pizzorno et al. | 425/46 |

FOREIGN PATENT DOCUMENTS

| | | |
|---|---|---|
| 0436495 | 7/1991 | European Pat. Off. . |
| 0552723 | 7/1993 | European Pat. Off. . |
| 2087540 | 12/1971 | France . |
| 44344406 | 3/1995 | Germany . |
| 62-48512 | 3/1987 | Japan ........ 425/46 |
| 5-228961 | 8/1993 | Japan . |
| 5-262574 | 10/1993 | Japan . |

*Primary Examiner*—James P. Mackey
*Attorney, Agent, or Firm*—Jacobson, Price, Holman & Stern, PLLC

[57] ABSTRACT

A force to separate the mold portions for both sides of a tire, created by the pressure of a heating/pressurizing medium introduced into the tire during the vulcanization of the tire, is offset via an upper disk, a segment having protrusions at both ends, and a lower disk. A force in the radial direction to move a tread mold outward is offset via the segment. A component of force in the axial direction (vertical direction) of a radial force, created by the interposition of a sliding inclined surface between the segment and the outer ring is offset via the outer ring, a cover plate, locking claws, the upper disk, and the segment.

1 Claim, 8 Drawing Sheets

SPLIT MOLD APPARATUS FOR A TIRE VULCANIZER

FIELD OF THE INVENTION AND RELATED ART STATEMENT

The present invention relates to a split mold apparatus used for a tire vulcanizer.

On the conventional tire vulcanizers, vulcanizing reaction is carried out by introducing a heating/pressurizing medium into a tire with the mold being closed. In this process, the vulcanizing reaction time is long, and the time taken for the loading of an unvulcanized tire, the molding, and the unloading of a vulcanized tire is very short as compared with the vulcanizing reaction time. Therefore, a tire loading/ unloading apparatus and an apparatus for opening/closing the tire vulcanizing mold to load/unload a tire have a low rate of operation. To solve this problem, the applicant of the present invention has already proposed a tire vulcanizing facility which comprises a set of mold opening/closing apparatuses and tire loading/unloading apparatuses and a plurality of molds (refer to the specification of Japanese Patent Application No. 5-228961 (No. 228961/1993)).

Figure 1:
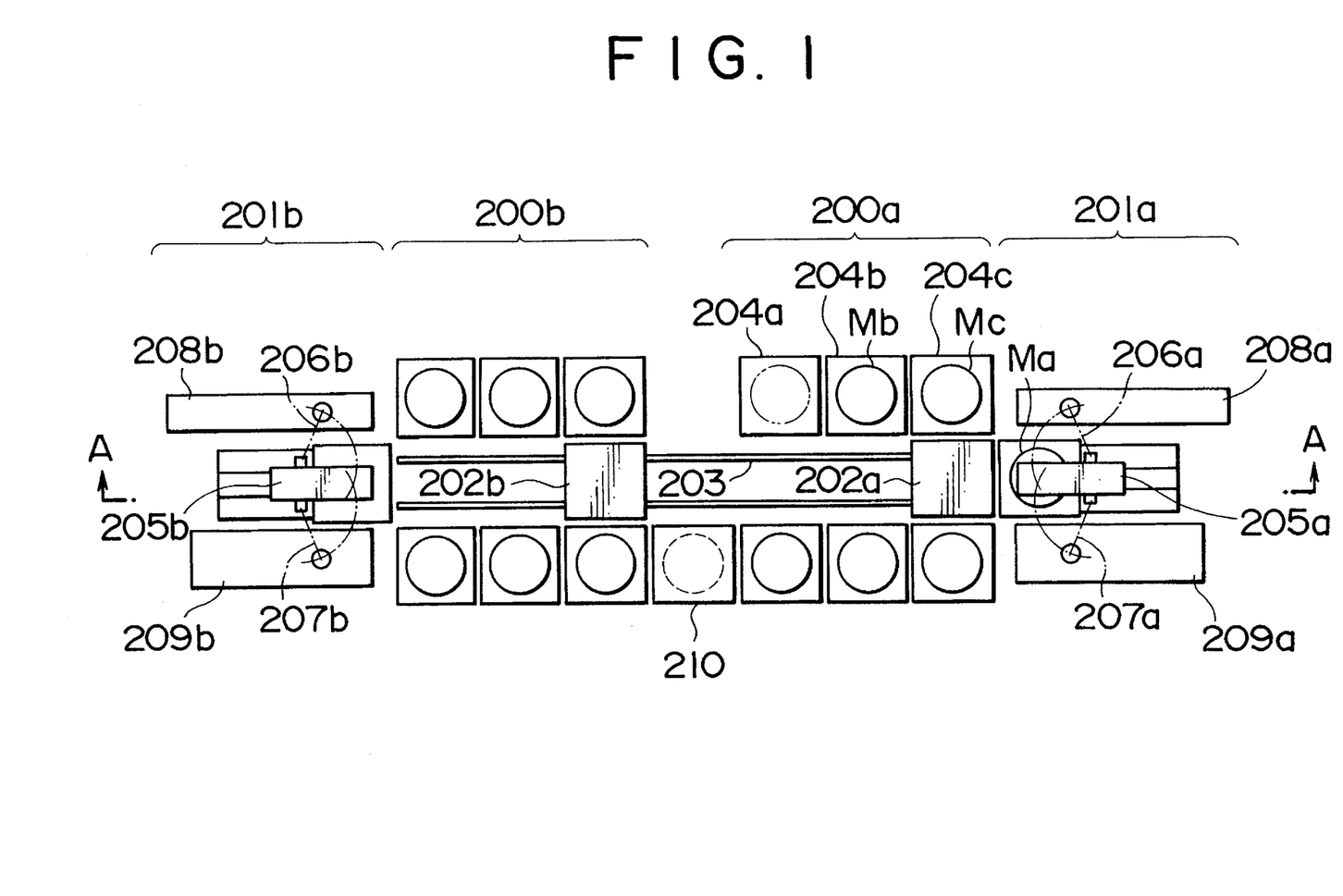
FIG. 1 is a plan view showing a tire vulcanizing facility to which the split mold apparatus for a tire vulcanizer in accordance with the present invention is applied.
Figure 2:
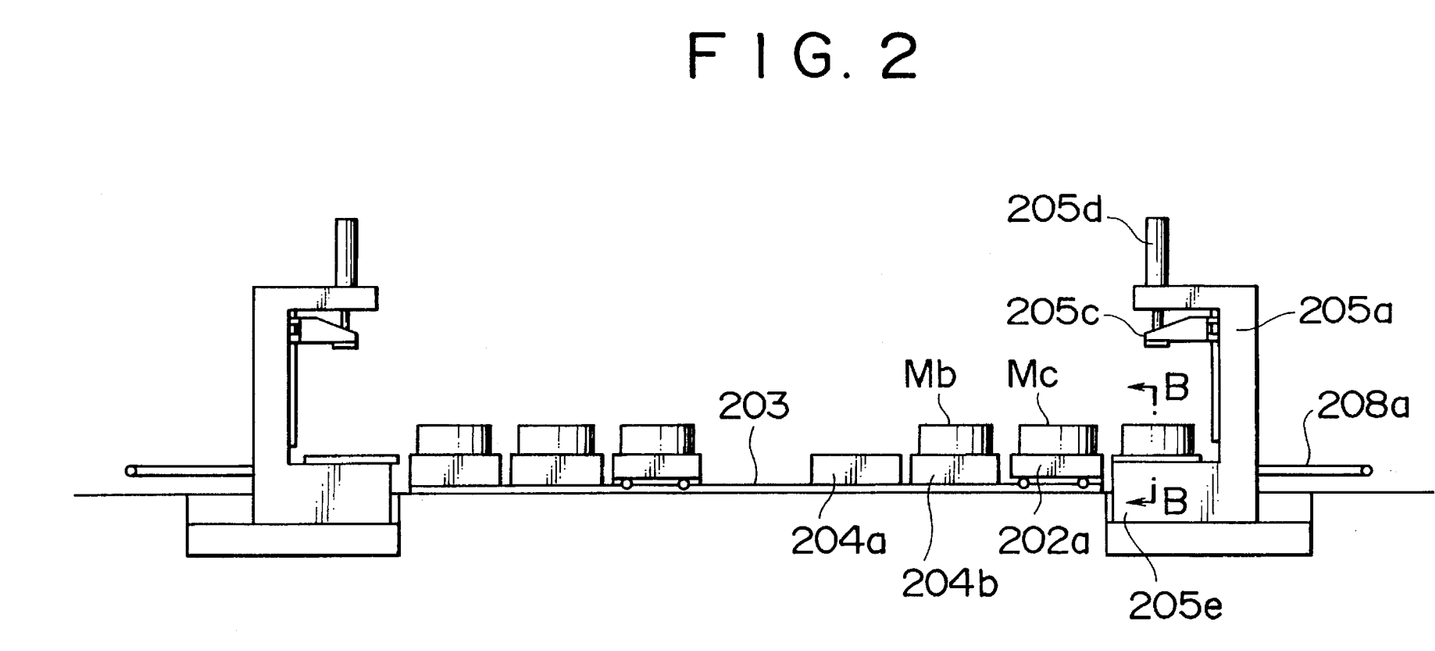
FIG. 2 is a side view of the tire vulcanizing facility shown in FIG. 1, viewed along the line A—A of FIG. 1.

In this tire vulcanizing facility, as shown in FIGS. 1 and 2, a tire vulcanizing mold Ma in which vulcanization is finished is received from a vulcanizing station 200a, in which a plurality of tire molds M (Mb, Mc, . . . ) in which vulcanizing reaction is being carried out are arranged, by means of a mold carrier 202a, and carried to a mold opening/closing station 201a. The tire vulcanizing mold Ma carried to the mold opening/closing station 201a is engaged with a mold opening/closing apparatus 205a, and then opened by the action of the mold opening/closing apparatus 205a, so that the vulcanized tire is unloaded by an unloader 206a attached to the mold opening/closing apparatus 205a. Then, an unvulcanized tire to be vulcanized next is loaded by an attached loader 207a into the tire vulcanizing mold Ma from which the vulcanized tire has been unloaded. The molding of the tire is performed during the process in which the tire vulcanizing mold is closed, and after the tire vulcanizing mold is closed, a heating/pressurizing medium is introduced and enclosed in the tire to start the tire vulcanizing process. The tire vulcanizing mold Ma, in which vulcanization has been started, is disengaged from the mold opening/closing apparatus 205a, carried by the mold carrier 202a, and returned to the vulcanizing station 200a.

The tire vulcanizing mold is subjected to a force to push and open the tire mold, which is created by the heating/ pressurizing medium introduced into the tire, during the vulcanization of tire. The applicant of the present invention has already proposed a tire vulcanizing mold in which the force to push and open the tire vulcanizing mold is offset in the tire vulcanizing mold (refer to the specification of Japanese Patent Application No. 5-262574 (No. 262574/ 1993)).

Figure 6:
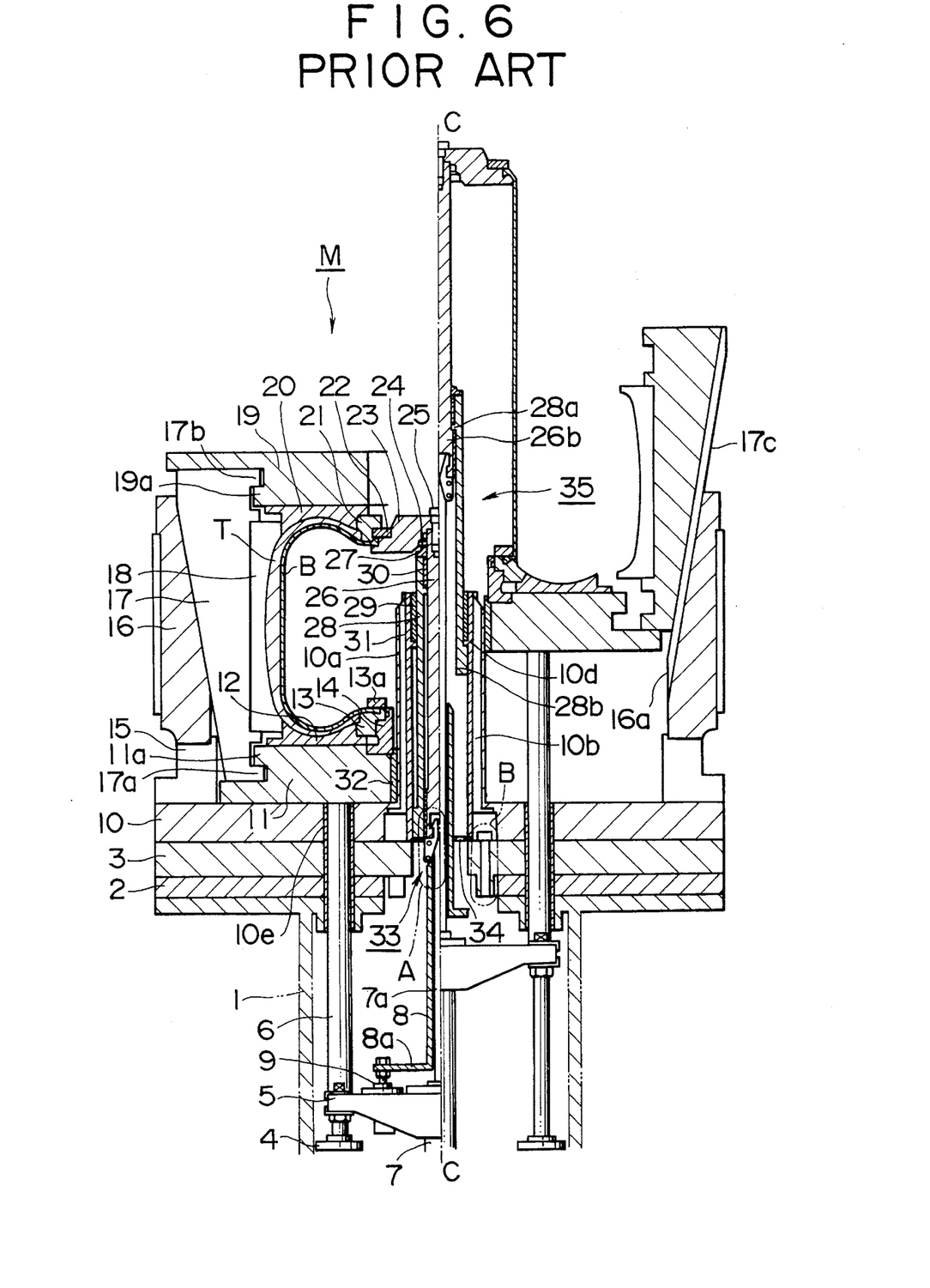
FIG. 6 is a sectional side view of a conventional mold for vulcanizing a tire.
Figure 7:
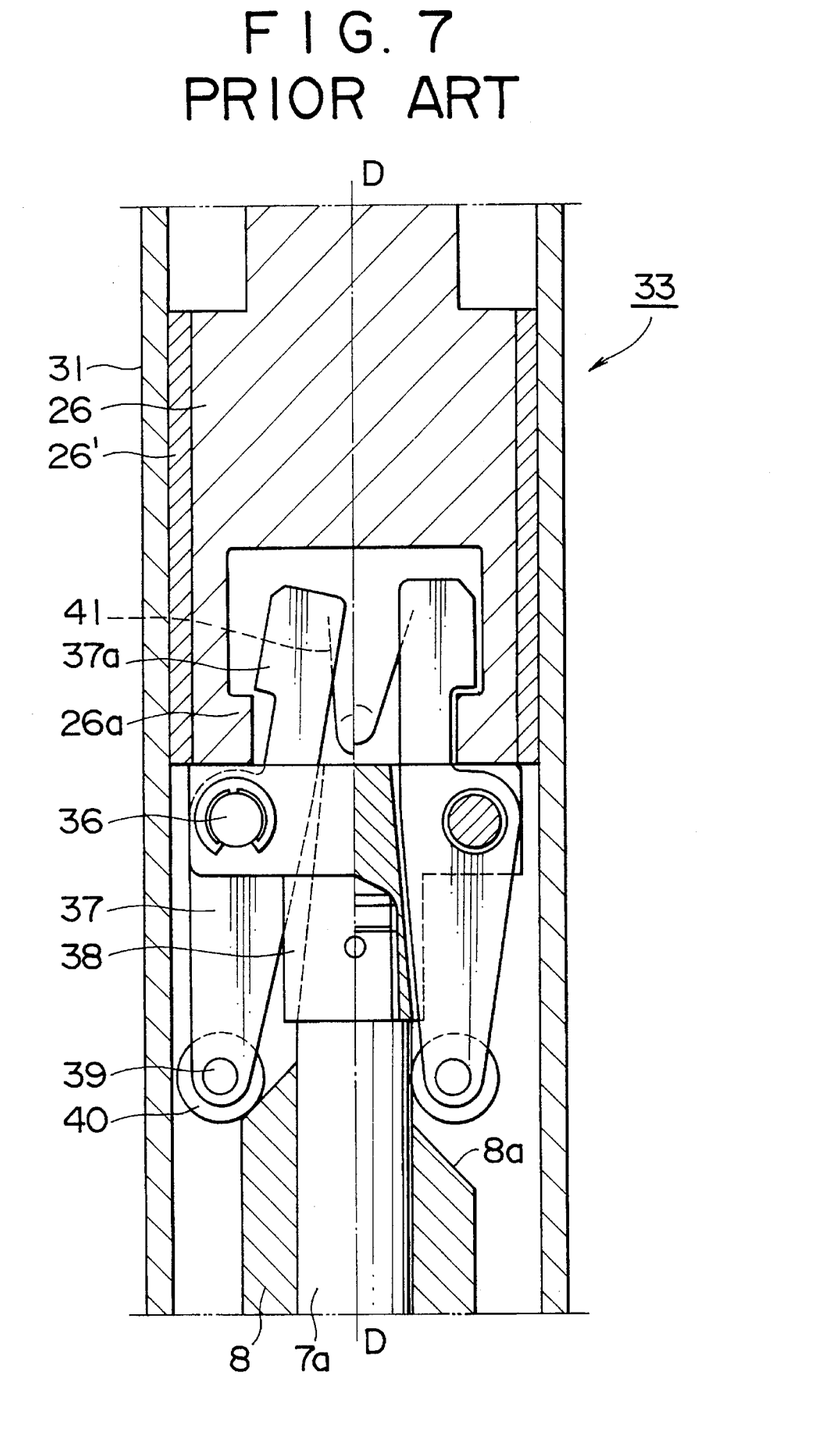
FIG. 7 is an enlarged sectional side view of a first attaching/detaching apparatus used for the tire vulcanizing mold shown in FIG. 6.
Figure 8:
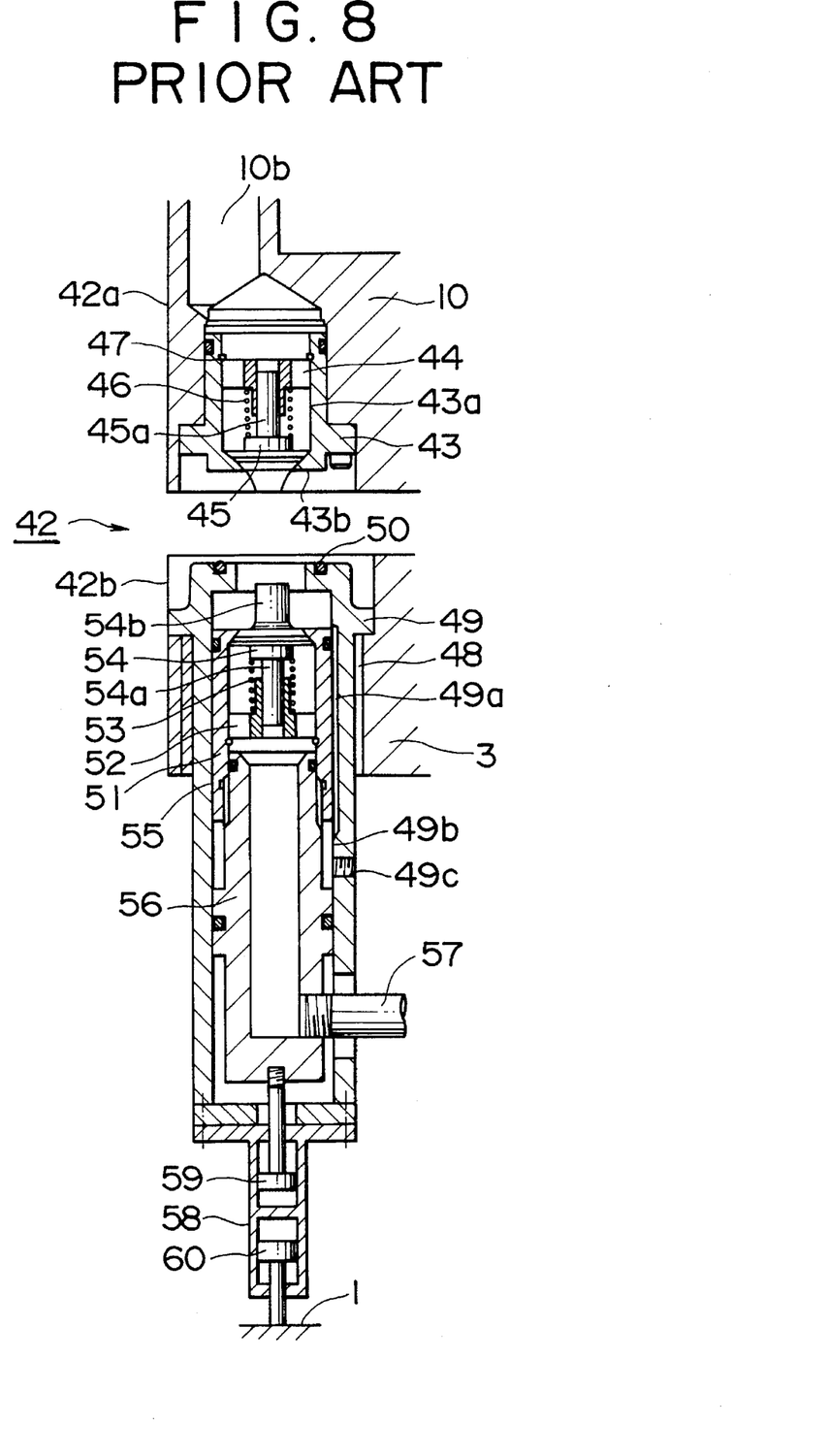
FIG. 8 is an enlarged sectional side view of a second attaching/detaching apparatus provided with check valves, which is used for the tire vulcanizing mold shown in FIG. 6.

As shown in FIGS. 6 to 8, this tire vulcanizing mold is locked concentrically to a plate 3 by means of a locking device (not shown) after the tire vulcanizing mold M in which vulcanization is finished is carried onto the plate 3 on a lower frame 205e of the mold opening/closing apparatus 205a. Then, an arm 205c is lowered by a cylinder 205d of the mold opening/closing apparatus 205a so that the arm 205c is connected to an upper hot plate 19 by means of an attaching/detaching apparatus (not shown).

Further, a first attaching/detaching apparatus 33 and a second attaching/detaching apparatus 42 provided with check valves are connected. Specifically, in the first attaching/detaching apparatus 33, a sleeve elevating cylinder 9 is operated in the sleeve raising direction to raise a sleeve 8. After a claw 37a is closed via a cam roller 40, a block 38 is raised by a center post cylinder 7. The sleeve 8 is raised at the same time, and the closed claw 37a is allowed to enter a hole formed at the lower end of a first center post 26. Then, the sleeve elevating cylinder 9 is operated in the sleeve lowering direction. The claw 37a is opened by the urging force of a spring 41 and engaged with a claw 26a of the first center post 26, by which the connection of the first attaching/ detaching apparatus 33 is completed.

In the second attaching/detaching apparatus 42 provided with check valves, after a body 49 is raised by means of a first piston 60 of a compound cylinder 58 to abut on a valve body 43 of a check valve 42a, a valve body 51 is raised by a second piston 59 of the compound cylinder 58 via an extension body 56. At this time, the protrusion 54b of a valve body 54 is first brought into contact with a valve body 45, the valve body 51 is further raised, and both of the check valves are opened, so that a passage 10b for the heating/ pressurizing medium in a base plate 10 of the tire vulcanizing mold M is connected to a pipe 57 in the tire vulcanizer, by which the connection of the second attaching/detaching apparatus 42 provided with check valves is completed.

Next, a switching valve (not shown) in the mold opening/ closing apparatus 205a is switched to discharge the heating/ pressurizing medium, which has been enclosed in the tire T via a bladder B, through the passage 10b, the attaching/ detaching apparatus 42 provided with check valves, and the pipe 57. When the internal pressure of the tire T is lowered sufficiently, a lower hot plate 11 is pushed up via a piston rod 6 of a mold opening/closing cylinder 4.

By the elevation of the lower hot plate 11, a tread mold 18 is relatively moved outward radially together with a segment 17. The tread mold 18 is separated from the tire T, and at the same time the engagement of a claw 11a with a claw 17a and the engagement of a claw 17b with a claw 19a are released.

Next, the arm 205c of the mold opening/closing apparatus 205a is raised, by which an upper sidewall mold 20 and an upper bead ring 21 are raised together with the upper hot plate 19, so that the upper sidewall mold 20 is separated from the tire T.

Then, the switching valve (not shown) is switched so that an upper bladder holding flange 23 is raised by the center post cylinder 7 via the first center post 26 while a negative pressure is maintained in the bladder B. Thereupon, the bladder B is pulled out from the interior of the tire T, and extended.

When the first center post 26 is raised, and a lower large-diameter portion 26b is brought into contact with an upper small-diameter hole 28a of an inside hole of a second center post 28, the second center post 28 is lifted. When a lower large-diameter portion 28b of the second center post 28 is brought into contact with an upper small-diameter portion 10d at the inner periphery of a cylindrical portion 10a of the base plate 10, the lifting is stopped. (However, depending on the size of the bladder B, the operation of the center post cylinder 7 is stopped halfway to stop the lifting of the first center post 26.)

After the bladder B has been pulled out from the interior of the tire T by the above-described operation, the vulcanized tire T is lifted and removed from the tire vulcanizing mold M by means of the unloader attached to the mold opening/closing apparatus, and an unvulcanized tire T to be vulcanized next is lifted and placed in the tire vulcanizing mold M.

After the loading of the unvulcanized tire is completed, the bladder B is inserted into the tire T by reversing the above procedure while a compressed fluid (steam or inert gas) of a low pressure is introduced into the bladder B. Then, the upper sidewall mold 20 is lowered. When the upper hot plate 19 comes in contact with the segment 17, the mold opening/closing cylinder 4 is pushed back. Thereupon, the lower hot plate 11 lowers, and the tread mold 18 moves inward radially.

In inserting the bladder B into the tire T, when the second center post 28 is lowered and is brought into contact with a stopper plate 34 fixed to the base plate 10, the lowering of the second center post 28 is stopped.

After the tread mold 18 has been closed, the switching valve is switched to introduce a heating/pressurizing medium into the bladder B through the pipe 57, the second attaching/detaching apparatus 42 provided with check valves, and the passage 10b, so that the vulcanization of the tire T is started. At this time, the force to open the tread mold 18 is offset by the pressure of the heating/pressurizing medium via an outer ring 16. The forces to open a lower sidewall mold 12 and the upper sidewall mold 20 are offset via the claw 11a and claw 17a and the claw 17b and claw 19a, which are engaged with each other, and the segment 17.

When vulcanization is started and the temperature and pressure in the tire T (in the bladder B) reaches predetermined values, the connection of the attaching/detaching apparatuses 33 and 42 is severed by reversing the above procedure. When the valve body 51 is lowered by means of the second piston 59 of the compound cylinder 58, both of the check valves are closed, so that the heating/pressurizing medium remains in a space between both check valves. Therefore, a switching valve, which is connected to the tip end of a pipe (not shown) screwed in a threaded hole 49c of the body 49, is opened so that the remaining heating/pressurizing medium is discharged to a safe space through a passage 49a, and then the body 49 is lowered by means of the first piston 60, by which the severing of the connection is completed.

After the severing of the connection of the attaching/detaching apparatuses 33 and 42 has been completed, the tire vulcanizing mold M is moved to the vulcanizing station 201a by means of the mold carrier 202a to continue the vulcanization.

In the conventional tire vulcanizing mold shown in FIG. 6, of the forces created, the forces to open the lower sidewall mold 12 and the upper sidewall mold 20 are offset by the pressure of the heating/pressurizing medium introduced into the bladder B via the claw 11a and claw 17a and the claw 17b and claw 19a, which are engaged with each other, and the segment 17. However, a sliding inclined surface is interposed between the segment 17 and the outer ring 16, so that a component of force to float the segment 17 is generated.

OBJECT AND SUMMARY OF THE INVENTION

The present invention is made to solve the above problems. Accordingly, an object of the present invention is to provide a split mold apparatus for a tire vulcanizer in which ① the angle of inclination of a sliding inclined surface interposed between a segment and an outer ring can be selected freely, ② the need for prolongation of the tire vulcanizing cycle time due to the addition of locking means can be eliminated, and ③ safety can be enhanced.

To achieve the above object, the present invention provides a split mold apparatus for a tire vulcanizer, having an upper disk to which an upper sidewall mold portion for molding one side of the tire is assembled, a lower disk to which a lower sidewall mold portion for molding the other side of the tire is assembled, a split segment to which a tread mold portion divided into plural pieces in the circumferential direction for molding a tire tread portion is assembled, and an outer ring having an inside inclined surface corresponding to an outside inclined surface of the segment and fitted so as to be capable of relative sliding concentrically with the segment with both the inclined surfaces being used as a sliding surface, wherein claws fitted to the upper and lower disks to prevent the separation of the upper and lower disks when the mold is closed are provided at the upper and lower parts of the segment, a cover plate whose outer periphery is fixed to the outer ring is provided above the upper disk, and a locking means for locking the upper disk and the cover plate when the mold is closed is provided between the cover plate and the upper disk.

Before the locking means operates, the cover plate is elastically deformed, so that the elastic return force is left between the outer ring and the upper disk even after locking is performed.

Since the split mold apparatus for a tire vulcanizer in accordance with the present invention is configured as described above, a heating/pressurizing medium introduced into a tire in a tire vulcanizing mold in which vulcanization is completed is discharged out of the mold, a mold opening/closing apparatus is connected, tread expanding/contracting means is connected to the upper disk via connecting means, and the locking means between the cover plate and the upper disk is released after the cover plate is elastically deformed. Subsequently, the tire vulcanizing mold is opened by the publicly known procedure, and the vulcanized tire is carried out of the mold in corporation with an unloader. Then, a green tire to be vulcanized is carried into the tire vulcanizing mold, and the molding is performed while the mold is closed. After the mold has been closed, the locking means and the connecting means are operated at the same time. The cover plate and the upper disk are locked with a preload being applied, and the connection between the upper disk and the tread expanding/contracting means is severed. Then, a heating/pressurizing medium is introduced into the tire, by which the vulcanization process is started. After that, the connection between the mold opening/closing apparatus and the mold apparatus is severed, and the mold opening/closing apparatus or the mold apparatus is moved to another place. A force to separate the mold portions for both sides of the tire, created by the pressure of a heating/pressurizing medium introduced in a tire during the vulcanization of tire, is offset via an upper disk, a segment having protrusions at both ends, and a lower disk. A force in the radial direction to move a tread mold outward, that is, a force converted into a component of force in the axial direction (vertical direction) of a radial force, created by the interposition of a sliding inclined surface between the segment and the outer ring is offset via the outer ring, a cover plate and an elastic return force of the cover plate, the locking means, the upper disk, and the segment.

In the split mold apparatus for a tire vulcanizer in accordance with the present invention, as described above, a component of force to float the outer ring, created by the pressure of a heating/pressurizing medium introduced into a tire during the vulcanization of the tire, that is, a component of force in the axial direction (vertical direction) of a radial force, created by the interposition of a sliding inclined surface between the segment and the outer ring is offset via the outer ring, the cover plate, the locking means, the upper disk, and the segment. Therefore, ① the angle of inclination of the sliding inclined surface interposed between the segment and the outer ring can be selected freely, ② the need for prolongation of the tire vulcanizing cycle time due to the addition of locking means can be eliminated by a simultaneous mechanical operation of the connecting device connecting to the mold opening/closing apparatus and the locking device, and ③ safety can be enhanced because the connection of the connecting device is not severed if the locking device does not lock and there is no driving means for operating the locking device when the mold apparatus is out of the mold opening/closing apparatus.

When the mold apparatus is applied to the conventional tire vulcanizing facility, there is no need for pressing the outer ring by means of an arm elevating cylinder, the source of working fluid for cylinder is not needed during the vulcanization of tire, and a large size mold, in which vulcanization could not be performed before, can be used if there is a space for the mold.

DETAILED DESCRIPTION OF PREFERRED EMBODIMENTS

One embodiment of the tire vulcanizing facility of the present invention will be described with reference to FIGS. 1 and 2.

A tire vulcanizing facility (FIGS. 1 and 2) to which the split mold apparatus for a tire vulcanizer in accordance with the present invention is applied will be described in more detail, though it has been explained to some extent in the related art statement.

A vulcanizing station 200 (200a and 200b) has a plurality of mold stands 204 (204a, 204b, 204c, . . . ) on which one of a plurality of tire vulcanizing molds M (Ma, Mb, Mc, . . . ) is mounted. Each mold stand 204 is provided with mold transfer means (for example, a pusher driven by a cylinder), heating/pressurizing medium replenishing means, piping, etc. as necessary (these elements are not shown). A mold opening/closing station 201 (201a and 201b) includes a mold opening/closing apparatus 205 (205a and 205b) similar to a publicly known tire vulcanizer (the difference will be described later), a publicly known unloader 206 (206a and 206b) for unloading a vulcanized tire from a tire mold, and a publicly known loader 207 (207a and 207b) for loading an unvulcanized tire into a tire vulcanizing mold, and is provided with a conveyor 208 (208a and 208b) for conveying a vulcanized tire and a rack 209 (209a and 209b) for an unvulcanized tire as necessary.

A mold carrier consists of rails 203 fixed to the floor surface and a publicly known carrier 202 (202a and 202b) which is run by the action of drive means (not shown). A mold change station consists of a mold change table 210, on which a tread mold, sidewall mold, etc. in the tire vulcanizing mold are changed pursuant to the specification change of tire to be vulcanized or a bladder, which is an expendable item, is changed, and is provided with a mold opening/closing means necessary for these changing operations. Tire mold preheating means may be attached to the mold change table 210. Alternatively, the mold change table 210 may be used simply as a temporary storage table for a tire vulcanizing mold or a tire mold preheating table, and the parts in the mold may be changed at another place by carrying the tire vulcanizing mold by using a forklift truck or the like.

Figure 3:
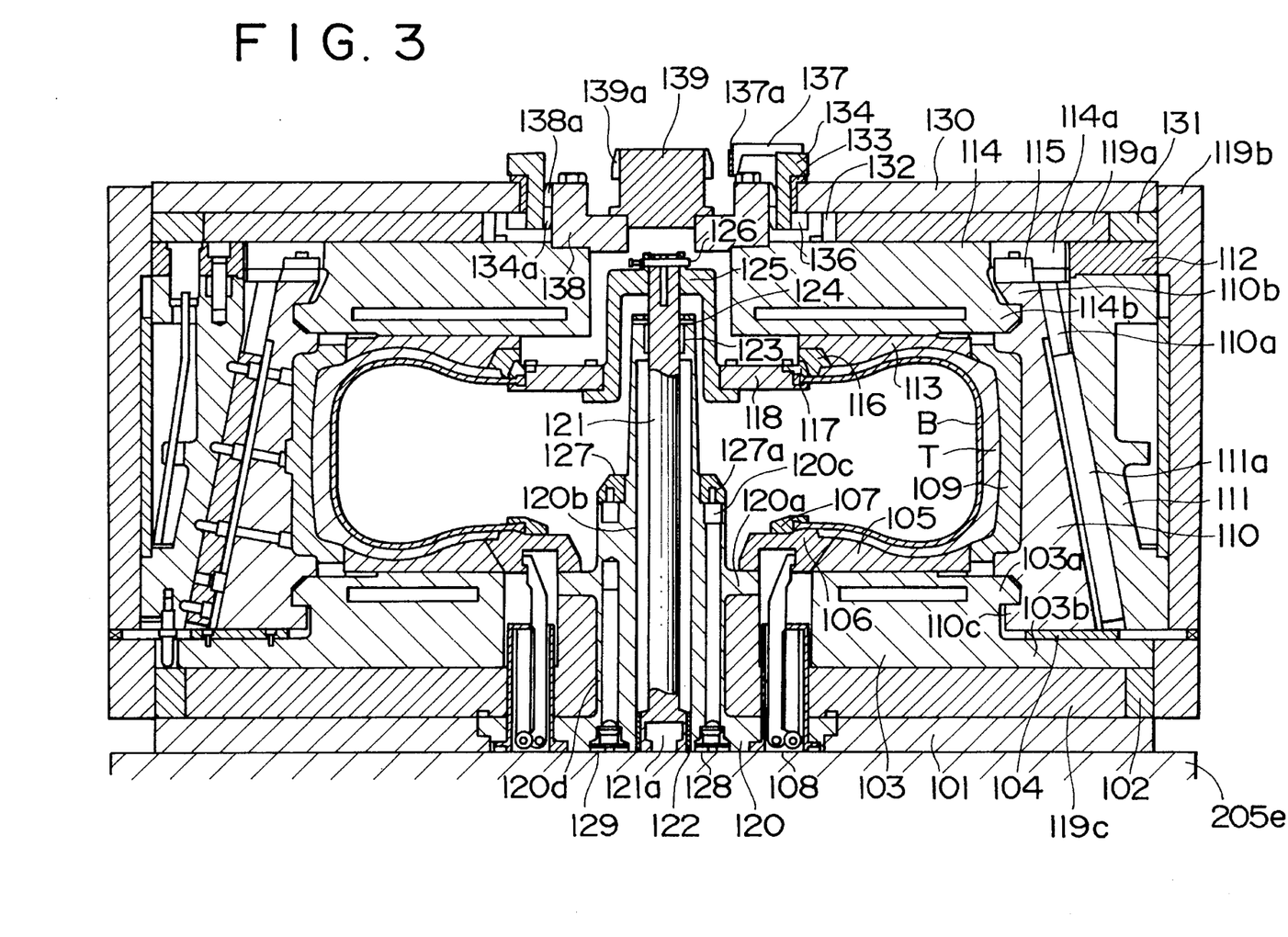
FIG. 3 is a sectional front view of one embodiment of the split mold apparatus for a tire vulcanizer in accordance with the present invention, taken along the line B—B of FIG. 2.

Next, the split mold apparatus for a tire vulcanizer in accordance with the present invention will be described in detail with reference to FIGS. 3 to 5. FIG. 3 shows a state in which an unvulcanized tire T is loaded, the tire vulcanizing mold is closed, a heating/pressurizing medium is introduced into the tire T via a bladder B, and vulcanization is started.

A base plate 101 for the tire vulcanizing mold M is mounted on a frame 205e of the mold opening/closing apparatus 205a in such a manner as to slide freely in the horizontal direction, and fixed to the frame 205e by a publicly known locking device (not shown).

Reference numeral 103 denotes a lower disk fixed to the base plate 101 via a hard heat insulating material 102 (although the lower disk 103 is also used as a hot plate by providing a passage for heating/pressurizing medium in this embodiment, a publicly known hot plate, which is independent of the lower disk 103, may be installed on the lower side of the lower disk 103), 105 denotes a lower sidewall mold fixed to the lower disk 103, and 106 denotes a lower bead ring having an outer peripheral surface engaging with the inner peripheral cylindrical surface of the lower sidewall mold 105. The lower bead ring 106 is detachably assembled to a flange 120a formed at the central outer peripheral portion of a cylindrical body 120 by means of a clamper 108. The lower end portion of the bladder B is held between a bladder hold-down device 107 bolted to the lower bead ring 106 and the lower bead ring 106.

The aforementioned cylindrical body 120 may be fixed to the base plate 101 as shown in FIG. 3, or may be fixed to the lower disk 103 or the independent hot plate on the lower side of the lower disk.

A tread mold 109, which is divided into plural pieces in the circumferential direction, is bolted to the inner peripheral surface of a segment 110, which is slidable on a pressure receiving plate 104. The pressure receiving plate 104, whose outer peripheral surface practically forms a conical surface when the tread mold 109 is being closed, is fixed onto a flange 103b formed at the outer peripheral portion of the lower disk 103.

Reference numeral 111 denotes an outer ring having, at the inner periphery thereof, a conical surface engaging with the outer peripheral surface of the segment 110. To the inner peripheral conical surface of the outer ring 111 is fixed a T bar 111a, which is slidable while engaging with a T groove 110a formed vertically on the outer peripheral conical surface of the segment 110. A plurality of arms 114a extending in the radial direction are provided at the outer peripheral portion of an upper disk 114. A slide guide 115, which is assembled to the arm 114a in such a manner as to slide freely in the radial direction, is fixed to the top surface of the segment 110. Therefore, when the upper disk 114 and the outer ring 111 move relatively in the axial direction, the tread mold 109 is expanded or contracted by moving in the radial direction via the segment 110. When the tread mold 109 is closed, the claws 110b and 110c formed at the upper end portion and the lower end portion of the segment 110 engage with the claws 114b and 103a formed at the outer peripheral portion of the upper disk 114 and the lower disk 103, respectively. When the tread mold 109 is opened, the engagement of the claw 110b with the claw 114b and the engagement of the claw 110c with the claw 103a are released.

Reference numeral 113 denotes an upper sidewall fixed to the upper disk 114 (although the upper disk 114 is also used as a hot plate by providing a passage for heating/pressurizing medium in this embodiment, a publicly known hot plate, which is independent of the upper disk 114, may be installed on the upper side of the upper disk 114), and 116 denotes an upper bead ring bolted to the upper side wall 113.

Reference numeral 121 denotes a center post inserted in the cylindrical body 120 in such a manner as to move vertically (slide), 122 denotes a bush which is installed integrally at the lower end portion of the center post and whose outer peripheral surface slides on the inner peripheral surface of the cylindrical body 120, 123 denotes a packing which is inserted at the upper end portion of the cylindrical body 120 and whose inner peripheral surface slides on the center post 121, and 124 denotes means for preventing the packing 123 from coming off. Automatic connecting means (similar to that shown in FIG. 7), which is assembled to the tip end of the rod of a center post elevating cylinder (not shown), is pressed in a concave portion 121a formed at the lower end portion of the center post 121. A cap 125 is fixed to the upper end portion of the center post with a pin 126.

Reference numeral 118 denotes a flange bolted to the cap 125, and 117 denotes a bladder hold-down device bolted to the flange 118. The upper end portion of the bladder B is held between the outer peripheral portion of the flange 118 and the bladder hold-down device 117. Both end portions of the bladder B are moved close to each other or apart from each other by the operation of the center post elevating cylinder.

A nozzle ring 127 having a plurality of nozzles 127a for introducing a heating/pressurizing medium into the tire T via the bladder B is fixed to the cylindrical body 120. Also, a passage 120c for heating/pressurizing medium, which communicates with the nozzles 127a, and a passage 120d for discharging the heating/pressurizing medium are formed in the cylindrical body 120. Quick couplers 128 and 129 provided with a check valve, which connect the passages 120c and 120d to pipes outside the mold apparatus, are assembled to the outlet portion of the passages 120c and 120d.

Reference numeral 130 denotes a cover plate. The outer peripheral portion of the cover plate 130 is bolted to the outer ring 111 via a spacer ring 112 and a hard heat insulating material 131. Reference numeral 132 denotes a spacer fixed to the upper disk 114, and 119a, 119b, and 119c denote soft heat insulating materials.

Locking means for the upper disk 114 and the cover plate 130 comprises an inner ring 138 bolted to the upper disk 114, an outer ring 134 rotatably assembled to the inner peripheral portion of the cover plate 130 via a bush 133, plural pairs of claws 134a and 138a, which are formed at the inner periphery of the outer ring 134 and at the outer periphery of the inner ring 138 and capable of engaging or passing in the axial direction in accordance with the rotation angle, and a swing rotation apparatus, described later.

Reference numeral 136 denotes means for preventing coming-off, fixed to the outer ring 134.

Figure 4:
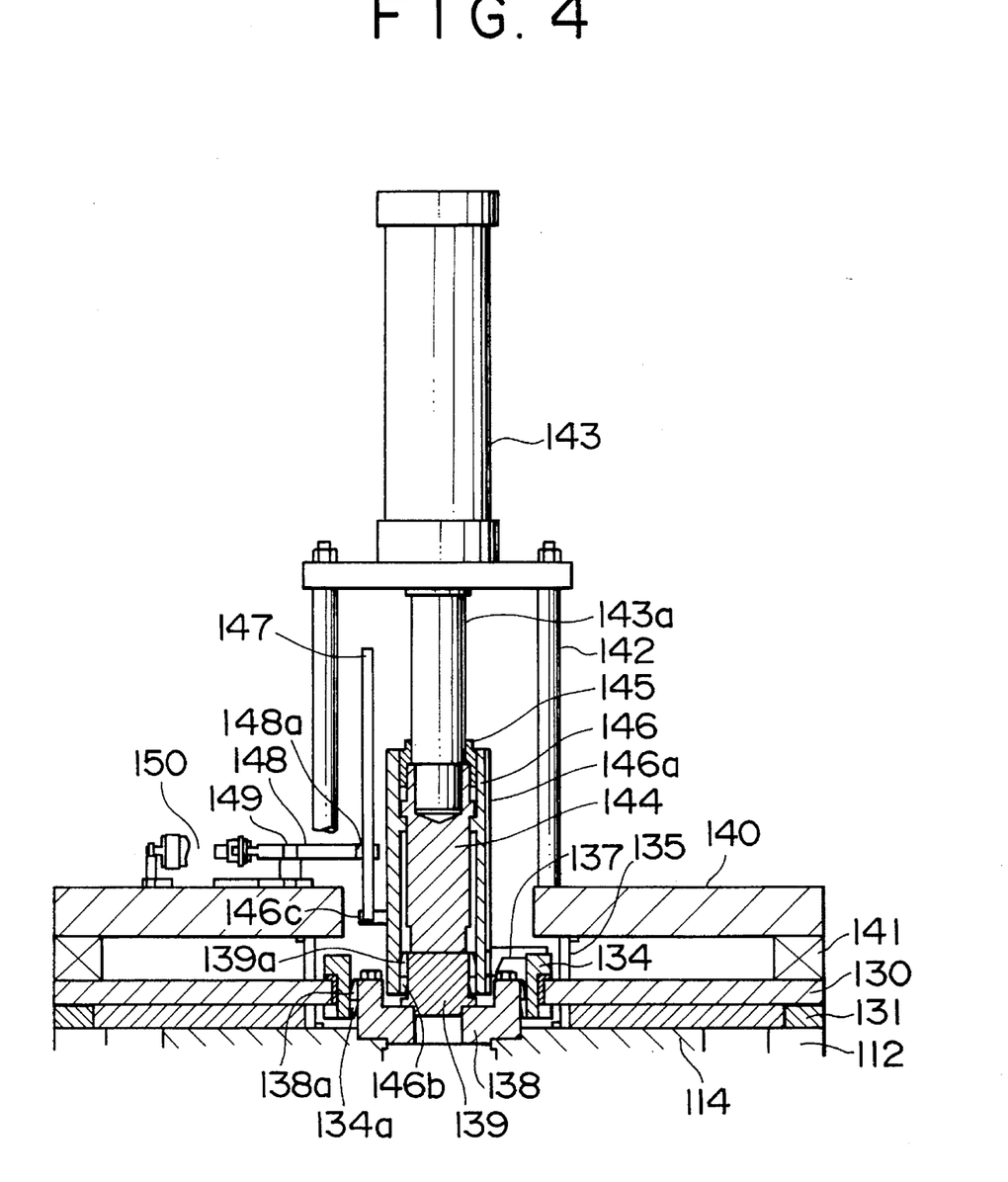
FIG. 4 is a sectional front view of one mode of the split mold apparatus for a tire vulcanizer shown in FIG. 3 and a mold opening/closing apparatus, taken along the line B—B of FIG. 2.
Figure 5:
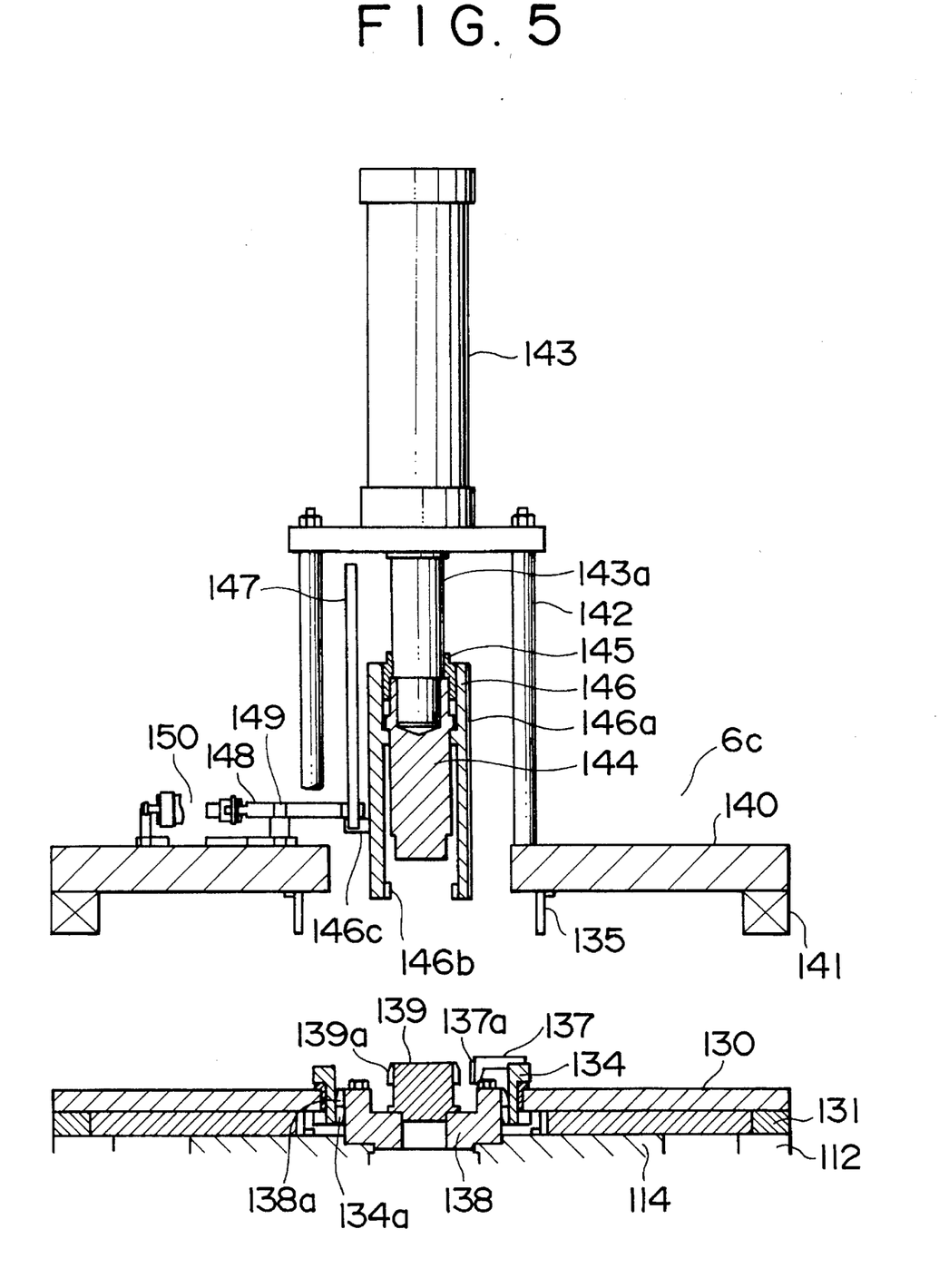
FIG. 5 is a sectional front view of another mode of the split mold apparatus for a tire vulcanizer shown in FIG. 3 and a mold opening/closing apparatus, taken along the line B—B of FIG. 2.

A bolster plate 140 shown in FIGS. 4 and 5, which is fixed to an arm 205c assembled to the column portion of the mold opening/closing apparatus 205a in such a manner as to move vertically (slide), is moved up and down by the operation of an elevating cylinder 205d.

Reference numeral 141 denotes a publicly known attaching/detaching device for attaching/detaching the bolster plate 140 and the cover plate 130, 135 denotes a pusher fixed to the bolster plate 140, 142 denotes a plurality of rods whose one end is fixed to the bolster plate 140, 143 denotes a mold opening/closing cylinder bolted to the other end of the rod 142, 144 denotes an extension rod fixed to the tip end of a rod 143a of the mold opening/closing cylinder 143, 146 denotes a sleeve rotatably (slidably) assembled to the extension rod 144, and 145 denotes a bush screwed in the upper end of the sleeve 146.

Connecting means for connecting the mold opening/closing cylinder 143 to the upper disk 114 comprises the extension rod 144, the bush 145, the sleeve 146, a connecting rod 139 installed integrally with the inner ring 138, plural pairs of claws 139a and 146b, which are formed at the upper part of outer periphery of the connecting rod 139 and at the lower part of inner periphery of the sleeve 146 and capable of engaging or passing in the axial direction in accordance with the rotation angle of the sleeve 146. A lever 148, whose tip end is formed into a fork shape, is rotatably assembled to the bolster plate 140 via a pin 149. Between the other end of the lever 148 and the bolster plate 140, a cylinder 150 is assembled. The lever 148 is swung around the pin 149 by the operation of the cylinder 150.

A rod 147, which is fixed to an arm 146c extending outward from the sleeve 146, is parallel to the sleeve 146. The rod 147 is inserted in a U-shaped groove formed in the fork portion at the tip end of the lever 148, and the tip end of an arm 137 is inserted in a key groove 146a formed at the outer periphery of the sleeve 146 in parallel with the axis, the arm 137 being fixed to the outer ring 134. When the lever 148 is swung by the operation of the cylinder 150, the sleeve 146 rotates, and the outer ring 134 also rotates via the sleeve 146 and the arm 137. By this rotation, when the set of the claws 134a and 138a are engaged, the claws 139a and 146b are capable of passing (released condition), and when the set of the claws 134a and 138a are capable of passing (released condition), the set of the claws 139a and 146b are engaged.

When the attaching/detaching device 141 for the bolster plate 140 is in contact with the cover plate 130, the pusher 135 pushes down the inner peripheral portion of the cover plate 130 and elastically deforms it, and controls the deformation by abutting on a spacer 132 fixed to the upper disk 114.

The outer ring 134, when being rotated, can be rotated easily with a gap in the height direction of the claw 134a at the inner peripheral portion of the outer ring 134 and the claw 138a at the outer periphery of the inner ring 138. Therefore, after the claw 134a and the claw 138a are engaged with each other by the rotation of the outer ring 134, the bolster plate 140 is raised. When the claw 134a comes in contact with the claw 138a, most of the lower displacement of the cover plate is left. The cover plate 130 acts as a spring to internally offset the relative movement of the outer ring 111, the segment 110, and the upper disk 114.

Specifically, the inside pressure in the tire creates a force in the radial direction of the tread mold 109 and the segment 110. This force is converted into an upward force by the inclined surface of the outer ring 111. The upward movement of the outer ring 111 with respect to the segment 110 is hindered by the downward elastic deformation force of the cover plate 130.

Next, the operation of the split mold apparatus for a tire vulcanizer in accordance with the present invention shown in FIGS. 3 to 5, which is applied to the tire vulcanizing facility shown in FIGS. 1 and 2, will be described in detail.

FIGS. 1 to 3, and 5 show a state in which the vulcanization of the tire in the tire vulcanizing mold Ma on the mold stand 204a of the vulcanizing station 200a has been completed, and the mold Ma has been carried into the mold opening/closing apparatus 205a of the mold opening/closing station 201a.

At this time, the set of the claws 134a and 138a are engaged with each other, and the set of the claws 139a and 146b are capable of passing.

From this condition, the cylinder 205d is first operated to lower the arm 205c, so that the cover plate 130 is connected to the bolster plate 140 by the attaching/detaching device 141 (refer to FIG. 4). The pusher 135 deforms the cover plate 130 downward, and a gap is produced between the engaging surfaces of the claws 134a and 138a. The passages 120c and 120d for heating/pressurizing medium are connected to the pipes outside the mold (not shown) via the quick couplers 128 and 129.

Then, the switching valve (not shown) is operated to discharge the heating/pressurizing medium in the tire T. After it is verified that the pressure in the tire T is lowered sufficiently, the cylinder 150 is operated to engage the set of the claws 139a and 146b. The upper disk 114 is connected to the rod 144 of the cylinder 143, and the set of the claws 134a and 138a becomes capable of passing, by which the lock is released.

Then, as publicly known, the cylinder 143 is operated in the direction in which the upper disk 114 is pushed down, and the cylinder 205d is operated in the direction in which the bolster plate 140 is raised. Thereupon, the tread mold 109 is separated from the tire T and moves outward radially, and the engagement of the claw 110b with the claw 114b and the engagement of the claw 103a and the claw 110c are released. When the bolster plate 140 is raised, and the cylinder 143 reaches the stroke end, the upper disk 114 is pulled up because the claw 139a engages with the claw 146b, so that the tire vulcanizing mold is opened.

Next, the vulcanized tire T is carried out of the tire vulcanizing mold, and then a tire to be vulcanized is loaded. Subsequently, the cylinder 205d is operated in the reverse direction to close the tire vulcanizing mold. Thereupon, the segment 110 suspended by the upper disk 114 first comes in contact with the pressure receiving plate 104, and then the cylinder 143 is pushed back. The outer ring 111 is lowered via the bolster plate 140, so that the tread mold 109 moves inward radially, by which the tire vulcanizing mold is closed. Further, the pusher 135 deflects the cover plate 130 downward.

During this time, a pressure gas for molding is introduced into the tire T. At the final stage of the contraction of the tread mold 109, the claw 110b engages with the claw 114b, and the claw 103a engages with the claw 110c.

After the tire vulcanizing mold has been closed, the operation of the cylinder 143 is stopped, and the cylinder 150 are operated in the reverse direction. The set of the claws 134a and 138a are engaged, the cover plate 130 and the upper disk 114 are locked, and the set of the claws 139a and 146b is capable of passing. The bolster plate 140 is raised, so that the claws 134a and 138a are engaged with each other. Then, a heating/pressurizing medium is introduced into the tire T, the vulcanization process being started.

At this time, a force to separate the sidewall molds 105 and 113 due to the pressure of the heating/pressurizing medium is offset in the mold apparatus via the upper disk 114, the claws 114b and 110b, the segment 110, the claws 110c and 103a, and the lower disk 103. Also, a force in the radial direction to move the tread mold 109 outward is offset in the outer ring 111 via the segment 110, and a vertical component of force in the radial direction, created by the sliding inclined surface interposed between the segment 110 and the outer ring 111, that is, a force to float the outer ring 111 is offset in the mold apparatus via the spacer ring 112, the hard heat insulating material 131, the cover plate 130 and the elastic return force of the cover plate, the outer ring 134, the claws 134a and 138a, the inner ring 138, the upper disk 114, and the claws 114b and 110b.

Therefore, there is no need for pushing the mold apparatus by means of an external force via the bolster plate 140. The attaching/detaching device 141 is released, the cylinder 205d is operated, and the arm 205c is raised. Then, the mold apparatus is moved to a predetermined position of the vulcanizing station by reversing the above procedure, and the vulcanization process is continued.

In the above-described embodiment, a set of mold opening/closing apparatuses and a plurality of mold apparatuses are combined, and applied to a vulcanizing facility used. However, the mold apparatus of the present invention can be applied to a tire vulcanizing facility in which the mold opening/closing apparatus or the mold apparatus is not moved to other places during the vulcanization of tire.

I claim:

1. A split mold apparatus for a tire vulcanizer, having an upper disk to which an upper sidewall mold portion for molding one side of a tire is assembled, a lower disk to which a lower sidewall mold portion for molding the other side of the tire is assembled, a split segment to which a tread mold portion divided into plural pieces in the circumferential direction for molding a tire tread portion is assembled, and an outer ring having an inside inclined surface corresponding to an outside inclined surface of said segment and fitted so as to be capable of relative sliding concentrically with said segment with both said inclined surfaces being used as a sliding surface, wherein claws fitted to said upper and lower disks to prevent the separation of said upper and lower disks when the split mold apparatus is closed are provided at upper and lower parts of said segment, a cover plate whose outer periphery is fixed to said outer ring is provided above said upper disk, and a locking means for locking said upper disk and said cover plate when the split mold apparatus is closed is provided between said cover plate and said upper disk wherein:

said cover plate is elastically deformed to the side of said upper disk, and said locking means is operable so as to establish a locking condition wherein most of the elastic deformation is left when an inside claw of an outer locking means ring rotatably mounted to an inner peripheral portion of said cover plate is engaged with an outside claw of an inner locking means ring fixed to an inner peripheral portion of said upper disk.

* * * * *